(12) United States Patent
Hocking

(10) Patent No.: US 7,866,395 B2
(45) Date of Patent: *Jan. 11, 2011

(54) HYDRAULIC FRACTURE INITIATION AND PROPAGATION CONTROL IN UNCONSOLIDATED AND WEAKLY CEMENTED SEDIMENTS

(75) Inventor: Grant Hocking, Alpharetta, GA (US)

(73) Assignee: GeoSierra LLC, Alpharetta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/686,425

(22) Filed: Mar. 15, 2007

(65) Prior Publication Data
US 2007/0199708 A1 Aug. 30, 2007

Related U.S. Application Data

(63) Continuation-in-part of application No. 11/363,540, filed on Feb. 27, 2006, now Pat. No. 7,748,458, and a continuation-in-part of application No. 11/277,308, filed on Mar. 23, 2006, now abandoned, and a continuation-in-part of application No. 11/685,019, filed on Mar. 12, 2007, now Pat. No. 7,404,441.

(51) Int. Cl.
*E21B 43/26* (2006.01)

(52) U.S. Cl. .................................. 166/308.6

(58) Field of Classification Search .................. None
See application file for complete search history.

(56) References Cited

U.S. PATENT DOCUMENTS

| | | | |
|---|---|---|---|
| 1,789,993 A | 1/1931 | Switzer |
| 2,178,554 A | 11/1939 | Bowie |
| 2,548,360 A | 4/1951 | Germain |
| 2,634,961 A | 4/1953 | Ljungström |
| 2,732,195 A | 1/1956 | Ljungström |
| 2,780,450 A | 2/1957 | Ljungström |
| 3,059,909 A | 10/1962 | Wise |
| 3,225,828 A | 12/1965 | Wisenbaker |
| 3,301,723 A | 1/1967 | Chrisp |
| 3,349,847 A | 10/1967 | Smith et al. |
| 3,739,852 A | 6/1973 | Woods et al. |
| 3,888,312 A | 6/1975 | Tiner |
| 3,994,340 A | 11/1976 | Anderson et al. |
| 4,085,803 A | 4/1978 | Butler |
| 4,099,570 A | 7/1978 | Vandergrift |
| 4,116,275 A | 9/1978 | Butler et al. |
| 4,119,151 A | 10/1978 | Smith |
| 4,271,696 A | 6/1981 | Wood |

(Continued)

*Primary Examiner*—Zakiya W Bates
*Assistant Examiner*—Angela M Ditrani
(74) *Attorney, Agent, or Firm*—Smith, Gambrell & Russell

(57) ABSTRACT

A method and apparatus for initiating and propagating a vertical hydraulic fracture in unconsolidated and weakly cemented sediments from a single bore hole to control the fracture initiation plane and propagation of the hydraulic fracture, enabling greater yield and recovery of petroleum fluids from the formation. An injection casing with multiple fracture initiation sections is inserted and grouted into a bore hole. A foam fracture fluid carrying a proppant is injected into the injection casing and opens the fracture initiation sections to dilate the formation in a direction orthogonal to the required fracture azimuth plane. Propagation of the fracture is controlled by limiting the fracture fluid form to that of a stable foam fracturing fluid during the fracturing process. The injection casing initiation section remains open after fracturing providing direct hydraulic connection between the production well bore, the permeable proppant filled fracture and the formation.

50 Claims, 11 Drawing Sheets

U.S. PATENT DOCUMENTS

| | | |
|---|---|---|
| 4,280,559 A | 7/1981 | Best |
| 4,344,485 A | 8/1982 | Butler |
| 4,450,913 A | 5/1984 | Allen et al. |
| 4,454,916 A | 6/1984 | Shu |
| 4,474,237 A | 10/1984 | Shu |
| 4,513,819 A | 4/1985 | Islip et al. |
| 4,519,454 A | 5/1985 | McMillen |
| 4,566,536 A | 1/1986 | Holmes |
| 4,597,441 A | 7/1986 | Ware et al. |
| 4,598,770 A | 7/1986 | Shu et al. |
| 4,625,800 A | 12/1986 | Venkatesan |
| 4,696,345 A | 9/1987 | Hsueh |
| 4,697,642 A | 10/1987 | Vogel |
| 4,706,751 A | 11/1987 | Gondouin |
| 4,716,960 A | 1/1988 | Eastlund et al. |
| 4,926,941 A | 5/1990 | Glandt et al. |
| 4,993,490 A | 2/1991 | Stephens et al. |
| 5,002,431 A | 3/1991 | Heymans |
| 5,046,559 A | 9/1991 | Glandt |
| 5,054,551 A | 10/1991 | Duerksen |
| 5,060,287 A | 10/1991 | Van Egmond |
| 5,060,726 A | 10/1991 | Glandt et al. |
| 5,065,818 A | 11/1991 | Van Egmond |
| 5,103,911 A | 4/1992 | Heijnen |
| 5,145,003 A | 9/1992 | Duerksen |
| 5,211,230 A | 5/1993 | Ostapovich et al. |
| 5,215,146 A | 6/1993 | Sanchez |
| 5,255,742 A | 10/1993 | Mikus |
| 5,273,111 A | 12/1993 | Brannan et al. |
| 5,297,626 A | 3/1994 | Vinegar et al. |
| 5,335,724 A | 8/1994 | Venditto |
| 5,339,897 A | 8/1994 | Leaute |
| 5,372,195 A | 12/1994 | Swanson |
| 5,392,854 A | 2/1995 | Vinegar et al. |
| 5,404,952 A | 4/1995 | Vinegar et al. |
| 5,407,009 A | 4/1995 | Butler |
| 5,431,224 A | 7/1995 | Laali |
| 5,472,049 A | 12/1995 | Chaffee |
| 5,607,016 A | 3/1997 | Butler |
| 5,626,191 A | 5/1997 | Greaves et al. |
| 5,711,376 A * | 1/1998 | Sydansk ................ 166/308.6 |
| 5,824,214 A | 10/1998 | Paul et al. |
| 5,862,858 A | 1/1999 | Wellington et al. |
| 5,871,637 A | 2/1999 | Brons |
| 5,899,269 A | 5/1999 | Wellington et al. |
| 5,899,274 A | 5/1999 | Frauenfeld et al. |
| 5,954,946 A | 9/1999 | Klazinga et al. |
| 6,023,554 A | 2/2000 | Vinegar et al. |
| 6,056,057 A | 5/2000 | Vinegar et al. |
| 6,076,046 A | 6/2000 | Vasudevan |
| 6,079,499 A | 6/2000 | Mikus et al. |
| 6,216,783 B1 | 4/2001 | Hocking |
| 6,318,464 B1 | 11/2001 | Mokrys |
| 6,360,819 B1 | 3/2002 | Vinegar |
| 6,372,678 B1 | 4/2002 | Youngman et al. |
| 6,412,557 B1 | 7/2002 | Ayasse et al. |
| 6,443,227 B1 | 9/2002 | Hocking |
| 6,591,908 B2 | 7/2003 | Nasr |
| 8,708,759 | 3/2004 | Leaute et al. |
| 6,722,431 B2 | 4/2004 | Karanikas et al. |
| 6,769,486 B2 | 8/2004 | Lim et al. |
| 6,830,105 B2 * | 12/2004 | Thesing .................... 166/280.1 |
| 6,883,607 B2 | 4/2005 | Nenniger et al. |
| 6,991,037 B2 | 1/2006 | Hocking |
| 2005/0145387 A1 * | 7/2005 | Hocking ................... 166/308.1 |

* cited by examiner

HYDRAULIC FRACTURE INITIATION AND PROPAGATION CONTROL IN UNCONSOLIDATED AND WEAKLY CEMENTED SEDIMENTS

RELATED APPLICATION

This application is a continuation-in-part of U.S. patent Ser. No. 11/363,540, now U.S. Pat. No. 7,748,458, filed Feb. 27, 2006, U.S. patent Ser. No. 11/277,308, filed Mar. 23, 2006, now abandoned, and U.S. patent Ser. No. 11/685,019, now U.S. Pat. No. 7,404,441, filed Mar. 12, 2007.

TECHNICAL FIELD

The present invention generally relates to enhanced recovery of petroleum fluids from the subsurface by injecting a fracture fluid to fracture underground formations, and more particularly to a method and apparatus to control the fracture initiation plane and propagation of the hydraulic fracture in a single well bore in unconsolidated and weakly cemented sediments using foam fracturing fluids resulting in increased production of petroleum fluids from the subsurface formation.

BACKGROUND OF THE INVENTION

Hydraulic fracturing of petroleum recovery wells enhances the extraction of fluids from low permeability formations due to the high permeability of the induced fracture and the size and extent of the fracture. A single hydraulic fracture from a well bore results in increased yield of extracted fluids from the formation. Hydraulic fracturing of highly permeable unconsolidated formations has enabled higher yield of extracted fluids from the formation and also reduced the inflow of formation sediments into the well bore. Typically the well casing is cemented into the borehole, and the casing perforated with shots of generally 0.5 inches in diameter over the depth interval to be fractured. The formation is hydraulically fractured by injecting the fracturing fluid into the casing, through the perforations, and into the formation. The hydraulic connectivity of the hydraulic fracture or fractures formed in the formation may be poorly connected to the well bore due to restrictions and damage due to the perforations. Creating a hydraulic fracture in the formation that is well connected hydraulically to the well bore will increase the yield from the well, result in less inflow of formation sediments into the well bore and result in greater recovery of the petroleum reserves from the formation.

Turning now to the prior art, hydraulic fracturing of subsurface earth formations to stimulate production of hydrocarbon fluids from subterranean formations has been carried out in many parts of the world for over fifty years. The earth is hydraulically fractured either through perforations in a cased well bore or in an isolated section of an open bore hole. The horizontal and vertical orientation of the hydraulic fracture is controlled by the compressive stress regime in the earth and the fabric of the formation. It is well known in the art of rock mechanics that a fracture will occur in a plane perpendicular to the direction of the minimum stress, see U.S. Pat. No. 4,271,696 to Wood. At significant depth, one of the horizontal stresses is generally at a minimum, resulting in a vertical fracture formed by the hydraulic fracturing process. It is also well known in the art that the azimuth of the vertical fracture is controlled by the orientation of the minimum horizontal stress in consolidated sediments and brittle rocks.

At shallow depths, the horizontal stresses could be less or greater than the vertical overburden stress. If the horizontal stresses are less than the vertical overburden stress, then vertical fractures will be produced; whereas if the horizontal stresses are greater than the vertical overburden stress, then a horizontal fracture will be formed by the hydraulic fracturing process.

Techniques to induce a preferred horizontal orientation of the fracture from a well bore are well known. These techniques include slotting, by either a gaseous or liquid jet under pressure, to form a horizontal notch in an open bore hole. Such techniques are commonly used in the petroleum and environmental industry. The slotting technique performs satisfactorily in producing a horizontal fracture, provided that the horizontal stresses are greater than the vertical overburden stress, or the earth formation has sufficient horizontal layering or fabric to ensure that the fracture continues propagating in the horizontal plane. Perforations in a horizontal plane to induce a horizontal fracture from a cased well bore have been disclosed, but such perforations do not preferentially induce horizontal fractures in formations of low horizontal stress. See U.S. Pat. No. 5,002,431 to Heymans.

Various means for creating vertical slots in a cased or uncased well bore have been disclosed. The prior art recognizes that a chain saw can be used for slotting the casing. See U.S. Pat. No. 1,789,993 to Switzer; U.S. Pat. No. 2,178,554 to Bowie, et al., U.S. Pat. No. 3,225,828 to Wisenbaker, U.S. Pat. No. 4,119,151 to Smith, U.S. Pat. No. 5,335,724 to Venditto et al.; U.S. Pat. No. 5,372,195 to Swanson et al.; and U.S. Pat. No. 5,472,049 to Chaffee et al. Installing pre-slotted or weakened casing has also been disclosed in the prior art as an alternative to perforating the casing, because such perforations can result in a reduced hydraulic connection of the formation to the well bore due to pore collapse of the formation surrounding the perforation. See U.S. Pat. No. 5,103,911 to Heijnen. These methods in the prior art were not concerned with the initiation and propagation of the hydraulic fracture from the well bore in an unconsolidated or weakly cemented sediment. These methods were an alternative to perforating the casing to achieve better connection between the well bore and the surrounding formation and/or initiate the fracture at a particular location and/or orientation in the subsurface.

In the art of hydraulic fracturing subsurface earth formations from subterranean wells at depth, it is well known that the earth's compressive stresses at the region of fluid injection into the formation will typically result in the creation of a vertical two "winged" structure. This "winged" structure generally extends laterally from the well bore in opposite directions and in a plane generally normal to the minimum in situ horizontal compressive stress. This type of fracture is well known in the petroleum industry as that which occurs when a pressurized fracture fluid, usually a mixture of water and a gelling agent together with certain proppant material, is injected into the formation from a well bore which is either cased or uncased. Such fractures extend radially as well as vertically until the fracture encounters a zone or layer of earth material which is at a higher compressive stress or is significantly strong to inhibit further fracture propagation without increased injection pressure.

It is also well known in the prior art that the azimuth of the vertical hydraulic fracture is controlled by the stress regime with the azimuth of the vertical hydraulic fracture being perpendicular to the minimum horizontal stress direction. Attempts to initiate and propagate a vertical hydraulic fracture at a preferred azimuth orientation have not been successful, and it is widely believed that the azimuth of a vertical hydraulic fracture can only be varied by changes in the earth's stress regime. Such alteration of the earth's local stress regime has been observed in petroleum reservoirs subject to significant injection pressure and during the withdrawal of fluids resulting in local azimuth changes of vertical hydraulic fractures.

Hydraulic fracturing generally consists of two types, propped and unpropped fracturing. Unpropped fracturing consists of acid fracturing in carbonate formations and water or low viscosity water slick fracturing for enhanced gas production in tight formations. Propped fracturing of low permeability rock formations enhances the formation permeability for ease of extracting petroleum hydrocarbons from the formation. Propped fracturing of highly permeable formations is for sand control, i.e. to reduce the inflow of sand into the well bore, by placing a highly permeable propped fracture in the formation and pumping from the fracture, thus reducing the pressure gradients and fluid velocities due to draw down of fluids from the well bore. Hydraulic fracturing involves the literal breaking or fracturing of the rock by injecting a specialized fluid into the well bore passage through perforations in the casing to the geological formation at pressures sufficient to initiate and/or extend the fracture in the formation. The theory of hydraulic fracturing utilizes linear elasticity and brittle failure theories to explain and quantify the hydraulic fracturing process. Such theories and models are highly developed and generally sufficient for the art of initiating and propagating hydraulic fractures in brittle materials such as rock, but are totally inadequate in the understanding and art of initiating and propagating hydraulic fractures in ductile materials such as unconsolidated sands and weakly cemented formations.

Hydraulic fracturing has evolved into a highly complex process with specialized fluids, equipment, and monitoring systems. The fluids used in hydraulic fracturing vary depending on the application and can be water, oil, or multi-phase based. Aqueous based fracturing fluids consist of a polymeric gelling agent such as solvatable (or hydratable) polysaccharide, e.g. galactomannan gums, glycomannan gums, and cellulose derivatives. The purpose of the hydratable polysaccharides is to thicken the aqueous solution and thus act as viscosifiers, i.e. increase the viscosity by 100 times or more over the base aqueous solution. A cross-linking agent can be added which further increases the viscosity of the solution. The borate ion has been used extensively as a cross-linking agent for hydrated guar gums and other galactomannans, see U.S. Pat. No. 3,059,909 to Wise. Other suitable cross-linking agents are chromium, iron, aluminum, zirconium (see U.S. Pat. No. 3,301,723 to Chrisp), and titanium (see U.S. Pat. No. 3,888,312 to Tiner et al). A breaker is added to the solution to controllably degrade the viscous fracturing fluid. Common breakers are enzymes and catalyzed oxidizer breaker systems, with weak organic acids sometimes used.

Oil based fracturing fluids are generally based on a gel formed as a reaction product of aluminum phosphate ester and a base, typically sodium aluminate. The reaction of the ester and base creates a solution that yields high viscosity in diesels or moderate to high API gravity hydrocarbons. Gelled hydrocarbons are advantageous in water sensitive oil producing formations to avoid formation damage, that would otherwise be caused by water based fracturing fluids.

Foam based fracturing fluids consist of a liquid phase viscosifier, being a polymeric gelling agent such as solvatable (or hydratable) polysaccharide, e.g. galactomannan gums, glycomannan gums, and cellulose derivatives, surfactants, gaseous phase generally being nitrogen $N_2$ or carbon dioxide $CO_2$ or a combination of $N_2$ and $CO_2$, breakers, foaming agent and a clay stabilizer, typically potassium chloride KCl.

In certain cases methanol is added to enhance foam stability and in certain cases the liquid phase polymer viscosifier is substituted by a non-polymer surfactant. Foam fluid functional properties, such as proppant carrying capacity, resistance to leakoff, and viscosity for fracture width creation, are derived from the foam structure and the liquid phase properties. Foam structure is preserved by the formation of stable interfacial surfaces that basically entrain the liquid and gaseous phases within the foam structure. This foam structure breaks down over time and thus it is important to design the foam to be stable during the fracturing process. Foams used as hydraulic fracturing fluids can vary considerably in quality, texture and rheology depending on the application in hand, but all foams have certain stability properties that entrain the liquids and gaseous phases within its structure, albeit for a wide range of half lives.

Leak off of the fracturing fluid into the formation during the injection process has been conceptually separated into two types, spurt and linear or Carter leak off. Spurt occurs at the tip of the fracture and is the fracturing fluid lost to the formation in this zone. In highly permeable formations spurt leak off can be a large portion of the total leak off. Carter leak off occurs along the fracture length as the fracture is propagated. Laboratory methods are used to quantify a fracturing fluid's leak off performance; however, analyses of actual field data on hydraulic fracturing of a formation is required to quantify the leak off parameters in situ, see U.S. Pat. No. 6,076,046 to Vasudevan et al.

The method of controlling the azimuth of a vertical hydraulic fracture in formations of unconsolidated or weakly cemented soils and sediments by slotting the well bore or installing a pre-slotted or weakened casing at a predetermined azimuth has been disclosed. The method disclosed that a vertical hydraulic fracture can be propagated at a pre-determined azimuth in unconsolidated or weakly cemented sediments and that multiple oriented vertical hydraulic fractures at differing azimuths from a single well bore can be initiated and propagated for the enhancement of petroleum fluid production from the formation. See U.S. Pat. No. 6,216,783 to Hocking et al, U.S. Pat. No. 6,443,227 to Hocking et al, U.S. Pat. No. 6,991,037 to Hocking, U.S. Pat. No. 7,748,458, U.S. patent application Ser. No. 11/277,308, filed Mar. 23, 2006, and U.S. Pat. No. 7,404,441, filed Mar. 12, 2007. The method disclosed that a vertical hydraulic fracture can be propagated at a pre-determined azimuth in unconsolidated or weakly cemented sediments and that multiple orientated vertical hydraulic fractures at differing azimuths from a single well bore can be initiated and propagated for the enhancement of petroleum fluid production from the formation.

The pumping rate of the fracturing fluid and the viscosity of the liquid phase fracturing fluids needs to be controlled, as described by Hocking (U.S. patent application Ser. No. 11/277,308, filed Mar. 23, 2006, and U.S. Pat. No. 7,404,441, filed Mar. 12, 2007) to initiate and propagate the fracture in a controlled manner in weakly cemented sediments. The dilation of the casing and grout imposes a dilation of the formation that generates an unloading zone in the formation, and such dilation of the formation reduces the pore pressure in the formation in front of the fracturing tip. It has been disclosed that laboratory and field experiments of hydraulic fracture initiation and propagation in weakly cemented sediments have quantified that without dilation of the formation in a direction orthogonal to the plane of the intended fracture, chaotic and/or multiple fractures and/or cavity expansion/ formation compaction zones are created rather than a single orientated fracture in a preferred azimuth direction irrespective of the pumping rate of the hydraulic fluid during attempted initiation of the fracture. Similar laboratory and field experiments of hydraulic fracture initiation and propagation in weakly cemented sediments have quantified that with dilation of the formation in a direction orthogonal to the plane of the intended fracture, if the pumping rate of the hydraulic fluid during attempted initiation of the fracture is not limited then chaotic and/or multiple fractures and/or cavity expansion/formation compaction zones are created rather than a single orientated fracture in a preferred azimuth direction. To ensure a repeatable single orientated hydraulic fracture is formed, the formation needs to be dilated orthogonal to the intended fracture plane, the liquid phase fracturing fluid pumping rate needs to be limited to avoid over-running the liquefied zone in front of the fracture tip and the viscosity of the liquid phase fracturing fluid has to be such so as not to negate the pore pressure gradients in front of the fracture tip.

In foam based fracturing fluids, the liquid and gaseous phases are entrained within the foam structure, and whilst the foam is in a stable state, these fluids do not separate from the foam under fracturing pumping pressures. Thus, liquids from the foam fracturing fluid cannot flow into the zone in front of the fracture tip, and due to the foam compressibility, cannot result in over-running the liquefied zone in front of the fracture. Therefore, by using foam fracturing fluids in weakly cemented formations, one will ensure that a stable repeatable orientated fracture can be initiated and propagated within these formations.

Accordingly, there is a need for a method and apparatus for controlling the initiation and propagation of a hydraulic fracture using foam based fracturing fluids in a single well bore in formations of unconsolidated or weakly cemented sediments, which behave substantially different from brittle rocks in which most of the hydraulic fracturing experience is founded. Also, there is a need for a method and apparatus that hydraulically connects the installed hydraulic fractures to the well bore without the need to perforate the casing.

SUMMARY OF THE INVENTION

The present invention is a method and apparatus for dilating the earth by various means from a bore hole to initiate and propagate a vertical hydraulic fracture formed at various orientations from a single well bore in formations of unconsolidated or weakly cemented sediments. The fractures are initiated by means of preferentially dilating the earth orthogonal to the desired fracture azimuth direction. This dilation of the earth can be generated by a variety of means: a driven spade to dilate the ground orthogonal to the required azimuth direction, packers that inflate and preferentially dilate the ground orthogonal to the required azimuth direction, pressurization of a pre-weakened casing with lines of weaknesses aligned in the required azimuth orientation, pressurization of a casing with opposing slots cut along the required azimuth direction, or pressurization of a two "winged" artificial vertical fracture generated by cutting or slotting the casing, grout, and/or formation at the required azimuth orientation. The initiation and propagation of the hydraulic fracture requires special consideration to the form of the fracturing fluid to maintain the orientation and control of the hydraulic fracture propagation in unconsolidated and weakly cemented sediments.

Weakly cemented sediments behave like a ductile material in yield due to the predominantly frictional behavior and the low cohesion between the grains of the sediment. Such particulate materials do not fracture in the classic brittle rock mode, and therefore the fracturing process is significantly different from conventional rock hydraulic fracturing. Linear elastic fracture mechanics is not applicable to the hydraulic fracturing process of weakly cemented sediments like sands. The knowledge base of hydraulic fracturing is primarily from recent experience over the past ten years and much is still not known on the process of hydraulically fracturing these sediments. However, the present invention provides data to enable those skilled in the art of hydraulic fracturing a method and apparatus to initiate and control the propagation of the hydraulic fracturing in weakly cemented sediments. The hydraulic fracturing process in these sediments involves the unloading of the particulate material in the vicinity of the dilation, and generating pore pressure gradients that, through liquefaction and particulate dilation, create a path of minimum resistance for the hydraulic fracture to propagate further. The form of the fracturing fluid needs to be controlled to ensure the propagating hydraulic fracture does not overrun this zone and lead to a loss of control of the propagating process. Also, liquids from the fracturing fluid need to be inhibited from separating from the fracturing fluid and flowing into the dilated liquefied zone in front of the fracture tip and thus destroying the controlled propagation of the fracturing process. Stable foam based fracturing fluids provide the compressibility and structure to entrain the liquids and gaseous phases within their form and therefore provide the means of controlling the initiation and propagation of the hydraulic fracturing process in weakly cemented sediments.

Once the first vertical hydraulic fracture is formed, second and subsequent multiple vertical hydraulic fractures can be initiated by a casing or packer system that seals off the first and earlier fractures and then by preferentially dilating the earth orthogonal to the next desired fracture azimuth direction, the second and subsequent fractures are initiated and controlled. The sequence of initiating the multiple azimuth orientated fractures is such that the induced earth horizontal stress from the earlier fractures is favorable for the initiation and control of the next and subsequent fractures. Alternatively multiple vertical hydraulic fractures at various orientations in the single well bore can be initiated and propagated simultaneously. The growth of each individual wing of each hydraulic fracture can be controlled by the individual connection and control of flow of fracturing fluid from the pumping system to each wing of the hydraulic fracture if required. Therefore a fracture with a single wing can be formed in these weakly cemented sediments by dilating and opening the casing along only a single weakening line.

The present invention pertains to a method for forming a vertical hydraulic fracture or fractures in a weakly cemented formation from a single borehole with the initiation and propagation of the hydraulic fracture controlled by the form of the fracturing fluid to enhance extraction of petroleum fluids from the formation surrounding the borehole. As such any casing system used for the initiation and propagation of the fractures will have a mechanism to ensure the casing remains open following the formation of each fracture in order to provide hydraulic connection of the well bore to the hydraulic fractures.

The fracture fluid used to form the hydraulic fractures has two purposes. First the fracture fluid must be formulated in order to initiate and propagate the fracture within the underground formation. In that regard, the fracture fluid has certain attributes. The fracture fluid needs to be a stable foam during the fracturing process to ensure that the dilating and modified pore pressure zone in front of the fracturing tip is maintained. The fracturing fluid should have leak off characteristics compatible with the formation and the pumping equipment, the fracture fluid should be clean breaking with minimal residue, and the fracture fluid should have a low friction coefficient.

Second, once injected into the fracture, the fracture fluid forms a highly permeable hydraulic fracture. In that regard, the fracture fluid comprises a proppant which produces the highly permeable fracture. Such proppants are typically clean sand for large massive hydraulic fracture installations or specialized manufactured particles (generally resin coated sand or ceramic in composition) which are designed also to limit flow back of the proppant from the fracture into the well bore.

The present invention is applicable to formations of unconsolidated or weakly cemented sediments with low cohesive strength compared to the vertical overburden stress prevailing at the depth of the hydraulic fracture. Low cohesive strength is defined herein as the greater of 200 pounds per square inch (psi) or 25% of the total vertical overburden stress. Examples of such unconsolidated or weakly cemented sediments are sand and sandstone formations, which have inherent high permeability but low strength that requires hydraulic fracturing to increase the yield of the petroleum fluids from such formations and simultaneously reducing the flow of formation sediments towards the well bore. Upon conventional hydraulic fracturing such formations will not yield the full production potential of the formation due to the lack of good hydraulic connection of the hydraulic fracture in the formation and the well bore, resulting in significant drawdown in the well bore causing formation sediments to flow towards the hydraulic fracture and the well bore. The flow of formation sediments towards the hydraulic fracture and the well bore, results in a decline over time of the yield of the extracted fluids from the formation for the same drawdown in the well. The present invention is applicable to formations of unconsolidated or weakly cemented sediments, such as tight gas sands, mudstones and shales, where large entensive propped vertical fractures intersect thin sand lens and provide drainage paths for greater gas production from the formation and also in oil sands, in which heavy oil (viscosity >100 centipoise) or bitumen (extremely high viscosity >100,000 centipoise) is contained in the pores of the sediment. Propped hydraulic fracturing of these sediments provide drainage paths for the cold production from these formations and access for steam, solvents, oils, and convective heat to increase the mobility of the petroleum hydrocarbons either by heat or solvent dilution and thus aid in the extraction of the hydrocarbons from the formation.

Although the present invention contemplates the formation of fractures which generally extend laterally away from a vertical or near vertical well penetrating an earth formation and in a generally vertical plane in opposite directions from the well, i.e. a vertical two winged fracture, those skilled in the art will recognize that the invention may be carried out in earth formations wherein the fractures and the well bores can extend in directions other than vertical and that all fractures need not be constructed with an opposing wing Therefore, the present invention provides a method and apparatus for initiating and controlling the growth of a vertical hydraulic fracture or fractures using foam based fracturing fluids in a single well bore in formations of unconsolidated or weakly cemented sediments.

Other objects, features and advantages of the present invention will become apparent upon reviewing the following description of the preferred embodiments of the invention, when taken in conjunction with the drawings and the claims.

DETAILED DESCRIPTION OF THE DISCLOSED EMBODIMENT

Several embodiments of the present invention are described below and illustrated in the accompanying drawings. The present invention involves a method and apparatus for initiating and propagating controlled vertical hydraulic fractures in subsurface formations of unconsolidated and weakly cemented sediments from a single well bore such as a petroleum production well. In addition, the present invention involves a method and apparatus for providing a high degree of hydraulic connection between the formed hydraulic fractures and the well bore to enhance production of petroleum fluids from the formation, also to enable the individual fracture wings to be propagated individually from its opposing fracture wing, and also to be able to re-fracture individually each fracture and fracture wing to achieve thickness and more permeability in placed fractures within the formation.

Figure 1:
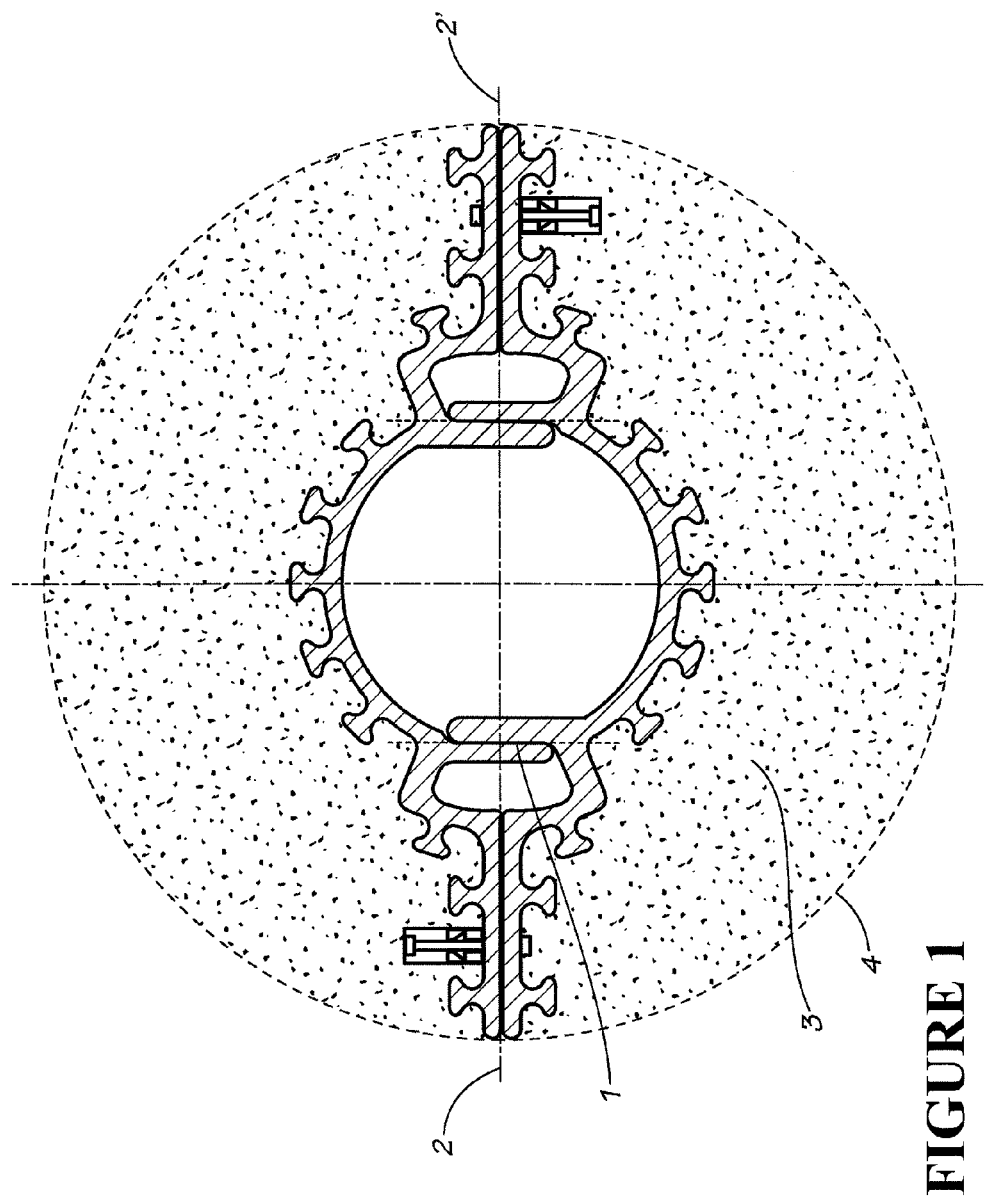
FIG. 1 is a horizontal cross-section view of a well casing having a single fracture dual winged initiation sections prior to initiation of the controlled vertical fracture.
Figure 2:
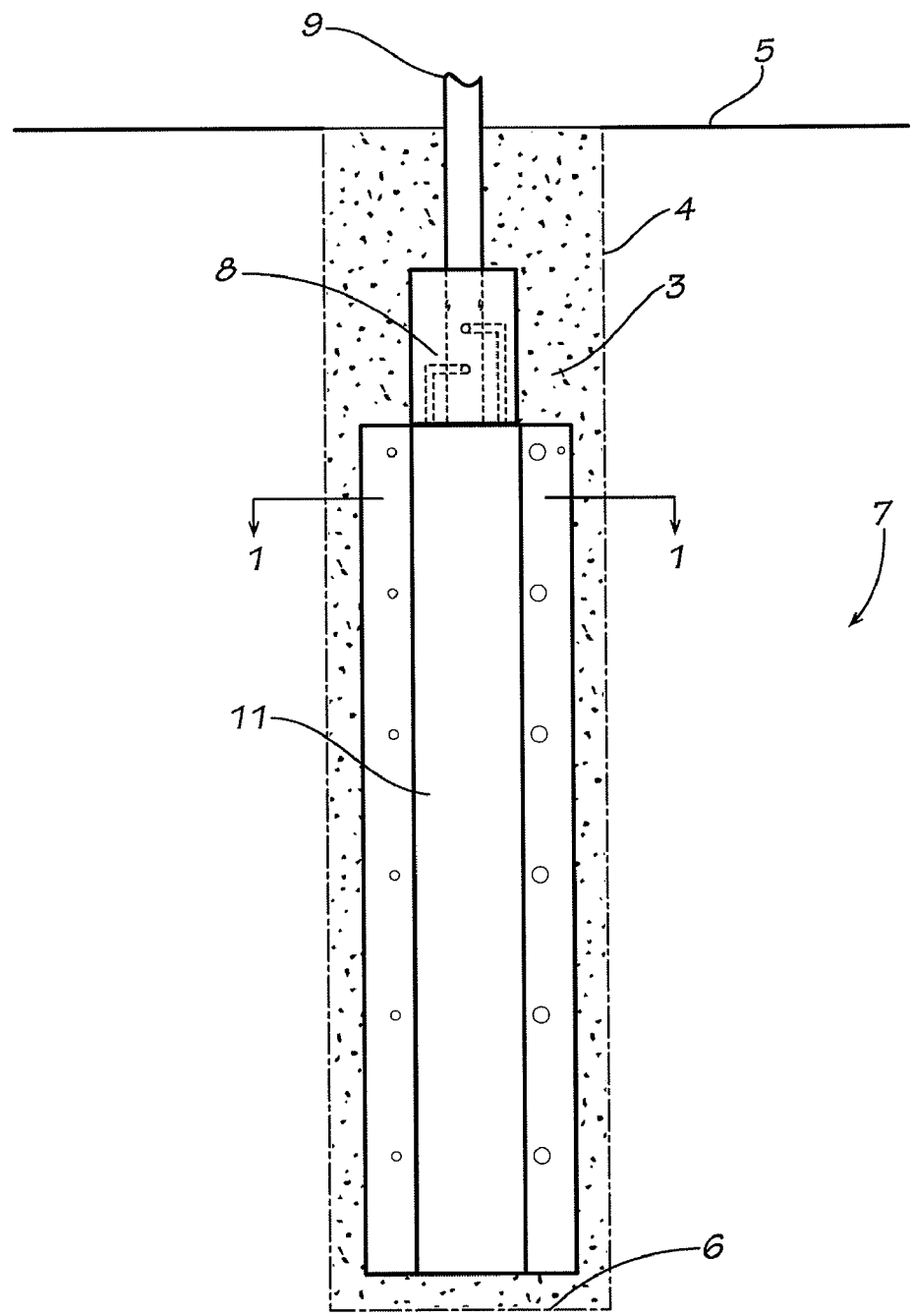
FIG. 2 is a cross-sectional side elevation view of a well casing single fracture dual winged initiation sections prior to initiation of the controlled vertical fracture.
Figure 3:
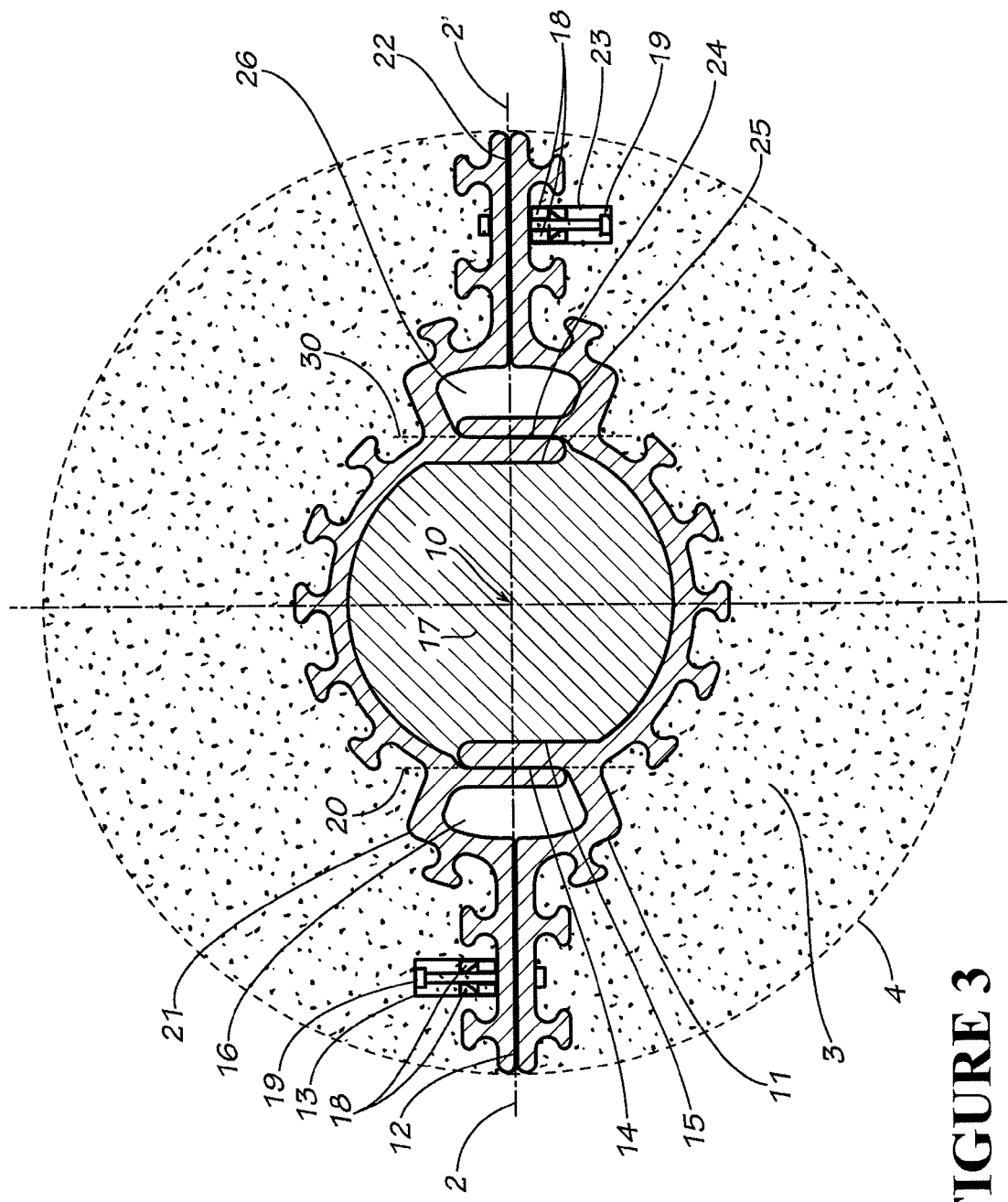
FIG. 3 is an enlarged horizontal cross-section view of a well casing having a single fracture dual winged initiation sections prior to initiation of the controlled vertical fracture.

Referring to the drawings, in which like numerals indicate like elements, FIGS. 1, 2, and 3 illustrate the initial setup of the method and apparatus for forming a single controlled vertical fracture with individual propagation control of each fracture wing. Conventional bore hole 4 is completed by wash rotary or cable tool methods into the formation 7 of unconsolidated or weakly cemented sediments to a predetermined depth 6 below the ground surface 5. Injection casing 1 is installed to the predetermined depth 6, and the installation is completed by placement of a grout 3 which completely fills the annular space between the outside of the injection casing 1 and the bore hole 4. Injection casing 1 consists of two initiation sections 11 and 21 (FIG. 3) to produce two hydraulic partings 71 and 72 which in turn produce a fracture orientated along plane 2, 2' as shown on FIG. 5. Injection casing 1 must be constructed from a material that can withstand the pressures that the fracture fluid exerts upon the interior of the injection casing 1 during the pressurization of the fracture fluid. The grout 3 can be any conventional material that preserves the spacing between the exterior of the injection casing 1 and the bore hole 4 throughout the fracturing procedure, preferably a non-shrink or low shrink cement based grout.

The outer surface of the injection casing 1 should be roughened or manufactured such that the grout 3 bonds to the injection casing 1 with a minimum strength equal to the down hole pressure required to initiate the controlled vertical fracture. The bond strength of the grout 3 to the outside surface of the casing 1 prevents the pressurized fracture fluid from short circuiting along the casing-to-grout interface up to the ground surface 5.

Figure 5:
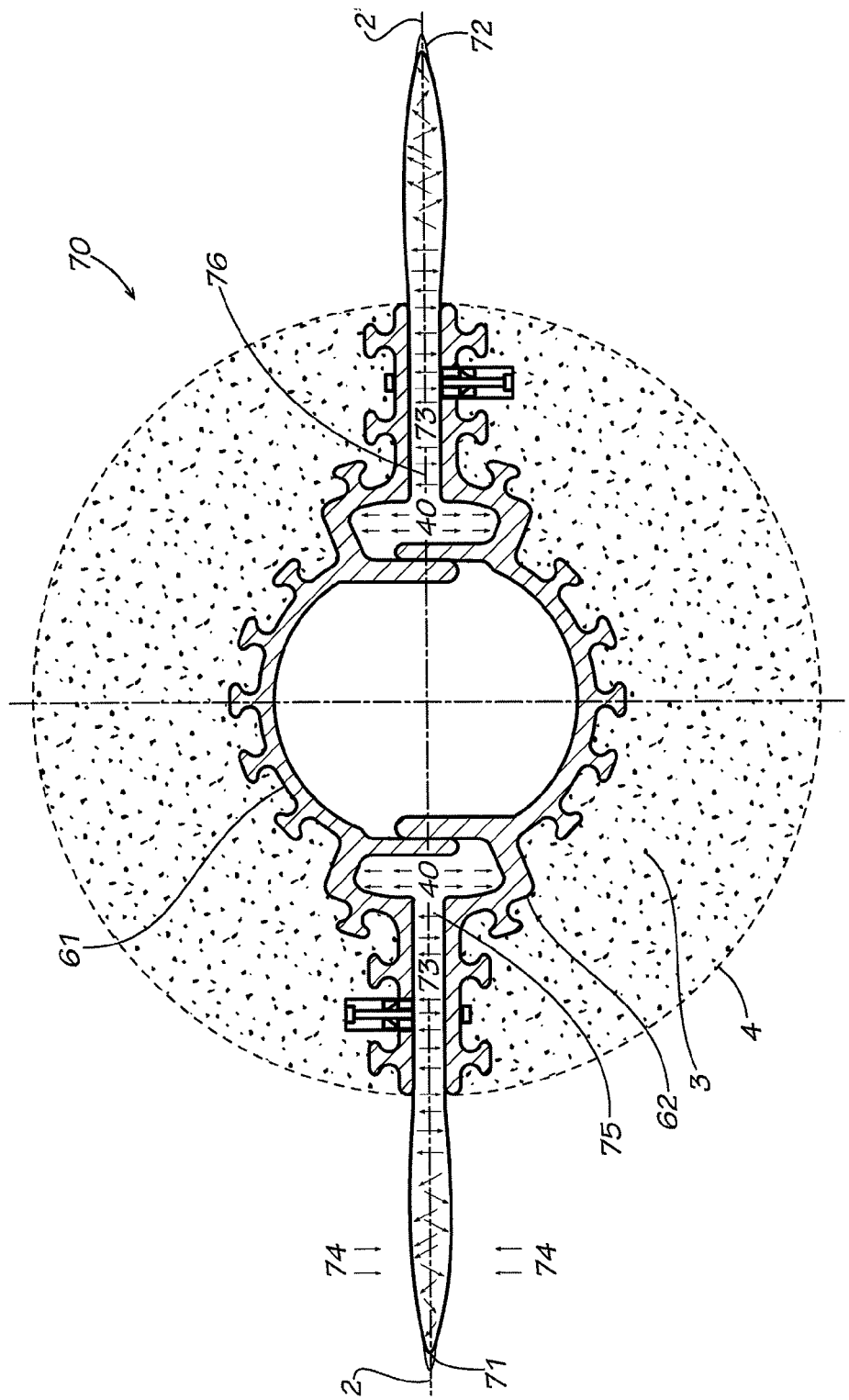
FIG. 5 is a horizontal cross-section view of a well casing having a single fracture dual winged initiation sections after initiation of the controlled vertical fracture.

Referring to FIGS. 1, 2, and 3, the injection casing 1 comprises a single fracture dual winged initiation sections 11 and 21 installed at a predetermined depth 6 within the bore hole 4. The winged initiation sections 11 and 21 can be constructed from the same material as the injection casing 1. The winged initiation sections 11 and 21 are aligned parallel with and through the fracture plane 2, 2'. The fracture plane 2, 2' coincide with the azimuth of the controlled vertical hydraulic fracture formed by partings 71 and 72 (FIG. 5). The position below ground surface of the winged initiation sections 11 and 21 will depend on the required in situ geometry of the induced hydraulic fracture and the reservoir formation properties and recoverable reserves.

The winged initiation sections 11 and 21 of the well casing 1 are preferably constructed from two symmetrical halves as shown on FIG. 3. The configuration of the winged initiation sections 11 and 21 is not limited to the shape shown, but the chosen configuration must permit the fracture to propagate laterally in at least one azimuth direction along the fracture plane 2, 2'. In FIG. 3, prior to initiating the fracture, the two symmetrical halves of the winged initiation sections 11 and 21 are connected together by shear fasteners 13 and 23, and the two symmetrical halves of the winged initiation sections 11 and 21 are sealed by gaskets 12 and 22. The gaskets 12 and 22 and the fasteners 13 and 23 are designed to keep the grout 3 from leaking into the interior of the winged initiation sections 11 and 21 during the grout 3 placement. The gaskets 12 and 22 align with the fracture plane 2, 2' and define weakening lines between the winged initiation sections 11 and 21. Particularly, the winged initiation sections 11 and 21 are designed to separate along the weakening line, which coincides with the fracture plane 2, 2'. During fracture initiation, as shown in FIG. 5, the winged initiation sections 11 and 21 separate along the weakening line without physical damage to the winged initiation sections 11 and 21. Any means of connecting the two symmetrical halves of the winged initiation sections 11 and 21 can be used, including but not limited to clips, glue, or weakened fasteners, as long as the pressure exerted by the fastening means keeping the two symmetrical halves of the winged initiation sections 11 and 21 together is greater than the pressure of the grout 3 on the exterior of the winged initiation sections 11 and 21. In other words, the fasteners 13 and 23 must be sufficient to prevent the grout 3 from leaking into the interior of the winged initiation sections 11 and 21. The fasteners 13 and 23 will open at a certain applied load during fracture initiation and progressively open further during fracture propagation and not close following the completion of the fracture. The fasteners 13 and 23 can consist of a variety of devices provided they have a distinct opening pressure, they progressively open during fracture installation, and they remain open even under ground closure stress following fracturing. The fasteners 13 and 23 also limit the maximum amount of opening of the two symmetrical halves of the winged initiation sections 11 and 21. Particularly, each of the fasteners 13 and 23 comprises a spring loaded wedge 18 that allows the fastener to be progressively opened during fracturing and remain open under compressive stresses during ground closure following fracturing with the amount of opening permitted determined by the length of the bolt 19.

Figure 4:
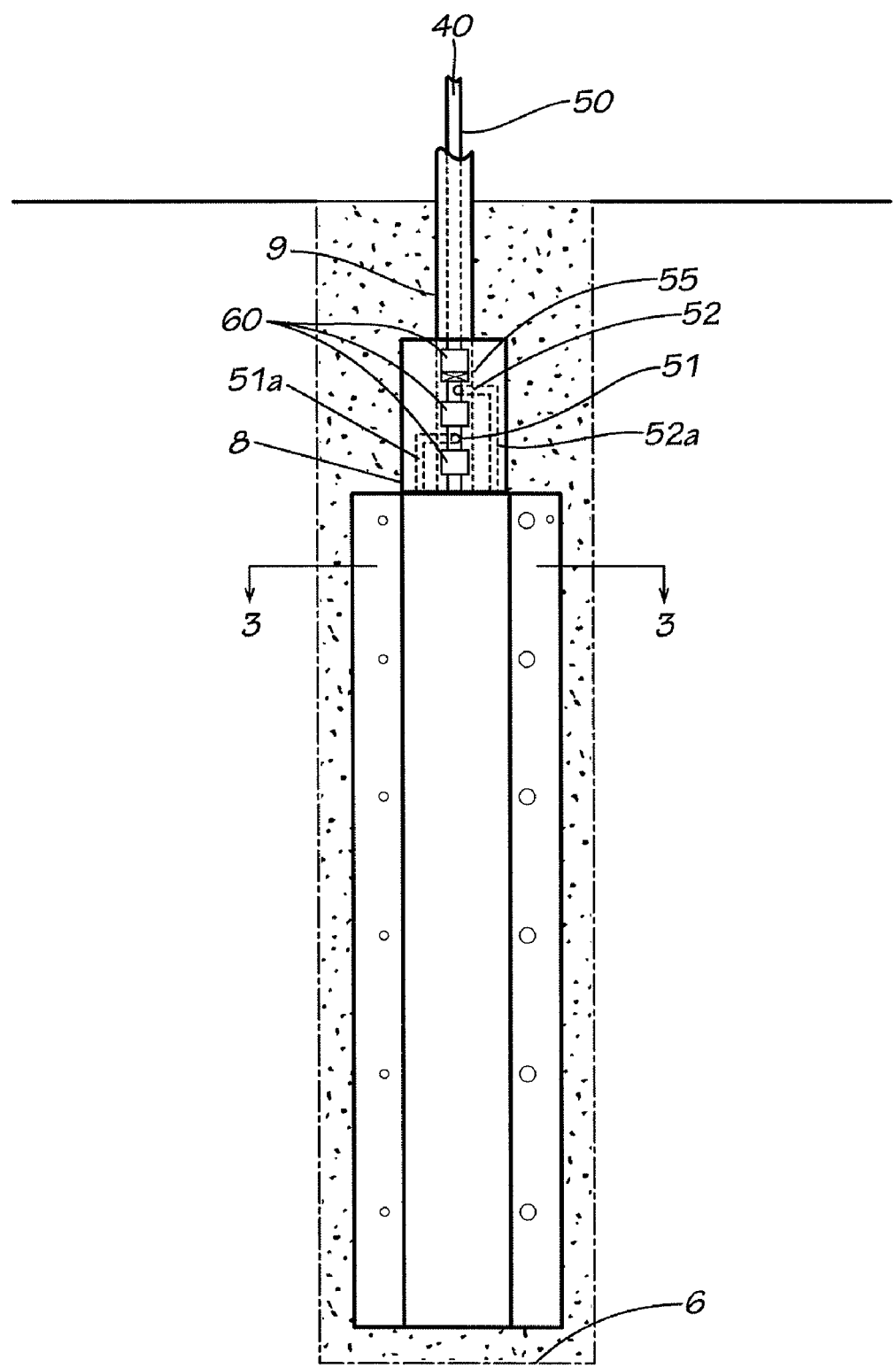
FIG. 4 is a cross-sectional side elevation view of a well casing having a single fracture dual winged initiation sections prior to initiation of the controlled vertical fracture.

Referring to FIG. 3, well screen sections 14, 15, 24 and 25 are contained in the two winged initiation sections 11 and 21. The screen sections 14, 15, 24 and 25 are slotted portions of the two winged initiation sections 11 and 12 which limit the passage of soil particles from the formation into the well bore. The screen sections 14, 15 and 24, 25 provide sliding surfaces 20 and 30 respectively enabling the initiation sections 11 and 21 to separate during fracture initiation and propagation as shown on FIG. 5. Referring to FIGS. 3 and 4, the passages 16 and 26 are connected via the injection casing 1 top section 8 to openings 51 and 52 in the inner casing well bore passage 9, which is an extension of the well bore passage 10 in the injection casing initiation section.

Referring to FIGS. 3, 4, and 5, prior to fracture initiation the inner casing well bore passage 9 and 10 is filled with sand 17 to below the lowest connecting opening 51. A single isolation packer 60 is lowered into the inner casing well bore passage 9 of the injection casing top section 8 and expanded within this section at a location immediately below the lowermost opening 51 as shown on FIG. 4. The fracture fluid 40 is pumped from the pumping system into the pressure pipe 50, through the single isolation packer 60, into the openings 51 and 52, through pipes 51a and 52a, and down to the passages 16 and 26 for the initiation and propagation of the fracture along the azimuth plane 2, 2'. The isolation packer 60 controls the proportion of flow of fracturing fluid by a surface controlled valve 55 within the packer that controls the proportional flow of fracturing fluid that enters either of the openings 51 and corresponding pipe 51a or 52 and corresponding pipe 52a, which subsequently feed the passages 16 and 26 respectively and thus the flow of fracturing fluid that enters each wing 75 and 76 of the fracture. Referring to FIG. 5, as the pressure of the fracture fluid 40 is increased to a level which exceeds the lateral earth pressures, the two symmetrical halves 61, 62 of the winged initiation sections 11 and 21 will begin to separate along the fracture plane 2, 2' of the winged initiation sections 11 and 21 during fracture initiation without physical damage to the two symmetrical halves 61, 62 of the winged initiation sections 11 and 21. As the two symmetrical halves 61, 62 separate, the gaskets 12 and 32 fracture, the screen sections 14, 15 and 24, 25 slide allowing separation of the two symmetrical halves 61, 62 along the fracture plane 2, 2', as shown in FIG. 5, without physical damage to the two symmetrical halves 61, 62 of the winged initiation sections 11 and 21. During separation of the two symmetrical halves 61, 62 of the winged initiation sections 11 and 21, the grout 3, which is bonded to the injection casing 1 (FIG. 5) and the two symmetrical halves 61, 62 of the winged initiation sections 11 and 21, will begin to dilate the adjacent sediments 70 forming partings 71 and 72 of the soil 70 along the fracture plane 2, 2' of the planned azimuth of the controlled vertical fracture. The fracture fluid 40 rapidly fills the partings 71 and 72 of the soil 70 to create the first fracture. Within the two symmetrical halves 61, 62 of the winged initiation sections 11 and 21, the fracture fluid 40 exerts normal forces 73 on the soil 70 perpendicular to the fracture plane 2, 2' and opposite to the soil 70 horizontal stresses 74. Thus, the fracture fluid 40 progressively extends the partings 71 and 72 and continues to maintain the required azimuth of the initiated fracture along the plane 2, 2'. The azimuth controlled vertical fracture will be expanded by continuous pumping of the fracture fluid 40 until the desired geometry of the first azimuth controlled hydraulic fracture is achieved. The rate of flow of the fracturing fluid that enters each wing 75 and 76 respectively of the fracture is controlled to enable the fracture to be grown to the desired geometry. Without control of the flow of fracturing fluid into each individual wing 75 and 76 of the fracture, heterogeneities in the formation 70 could give rise to differing propagation rates and pressures and result in unequal fracture wing lengths or undesirable fracture geometry.

Figure 6:
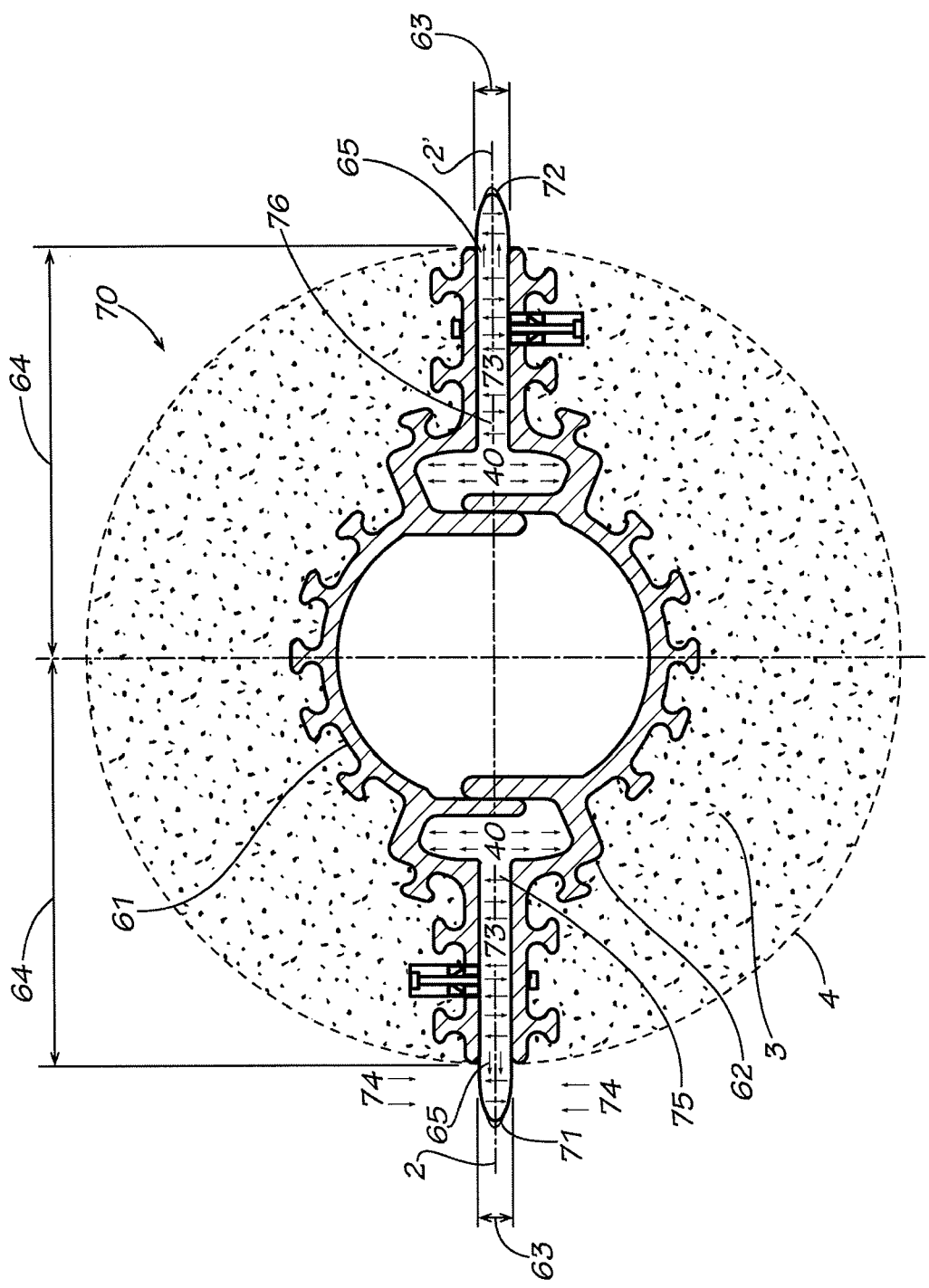
FIG. 6 is a horizontal cross-section view of the hydraulic fracture at initiation.
Figure 7:
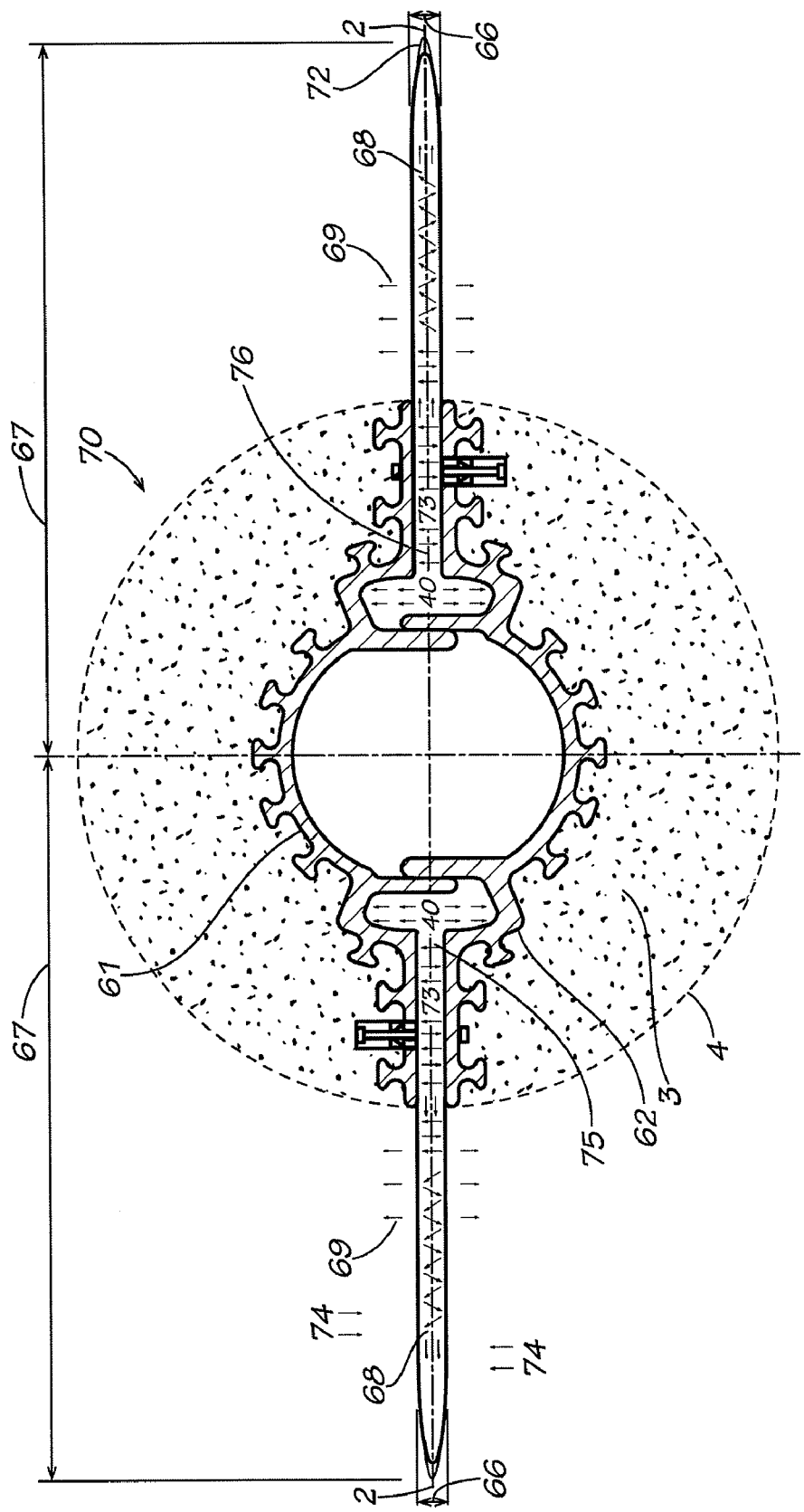
FIG. 7 is a horizontal cross-section view of the hydraulic fracture during propagation.

The dilation of the casing and grout imposes a dilation of the formation that generates an unloading zone in the soil as shown in FIGS. 5, 6, and 7, and such dilation of the formation reduces the pore pressure in the formation in front of the fracturing tip. Numerous laboratory and field experiments of hydraulic fracture initiation and propagation in weakly cemented sediments have quantified that without dilation of the formation in a direction orthogonal to the plane of the intended fracture, chaotic and/or multiple fractures and/or cavity expansion/formation compaction zones are created rather than a single orientated fracture in a preferred azimuth direction irrespective of the pumping rate of the hydraulic fluid during attempted initiation of the fracture. Similar laboratory and field experiments of hydraulic fracture initiation and propagation in weakly cemented sediments have quantified that with dilation of the formation in a direction orthogonal to the plane of the intended fracture, if the form of the fracturing fluid is not controlled during attempted initiation of the fracture then chaotic and/or multiple fractures and/or cavity expansion/formation compaction zones are created rather than a single orientated fracture in a preferred azimuth direction. To ensure a repeatable single orientated hydraulic fracture is formed, the formation needs to be dilated orthogonal to the intended fracture plane, the fracturing fluid needs to be a stable foam during the fracturing process, and thus by limiting the fracturing fluid to a stable foam, the liquid phase in the foam can not flow into the dilatant zone in the formation and thus negate the induce pore pressure from formation dilation, thus ensuring the fracture will propagate along the intended azimuth in a controlled manner. The compressibility of the foam provides the buffer to inhibit the foam fracturing fluid from over-running the liquefied zone in front of the fracture tip.

Following completion of the fracture and breaking of the fracture fluid 40, the sand in the injection casing well bore passages 9 and 10 is washed out, and the injection casing acts as a production well bore for extraction of fluids from the formation at the depths and extents of the recently formed hydraulic fractures. The well screen sections 14, 15 and 24, 25 span the opening of the well casing created by the first fracture and act as conventional well screen preventing proppant flow back into the production well bore passages 10 and 9. If necessary and prior to washing the sand from the production well bore passages 9 and 10 for fluid extraction from the formation, it is possible to re-fracture the already formed fractures by first washing out the sand in passages 16 and 26 through the openings 51 and 52 and thus re-fracture the first initiated fracture. Re-fracturing the fractures can enable thicker and more permeable fractures to be created in the formation.

Referring to FIGS. 4 and 5, once the fracture is initiated, injection of a fracture fluid 40 through the well bore passage 9 in the injection casing 1, into the inner passages 16 and 26 of the initiation sections 11 and 21, and into the initiated fracture can be made by any conventional means to pressurize the fracture fluid 40. The conventional means can include any pumping arrangement to place the fracture fluid 40 under the pressure necessary to transport the fracture fluid 40 and the proppant into the initiated fracture to assist in fracture propagation and to create a vertical permeable proppant filled fracture in the subsurface formation. For successful fracture initiation and propagation to the desired size and fracture permeability, the preferred embodiment of the fracture fluid 40 should have the following characteristics.

The fracture fluid 40 should be a stable foam during the fracturing process and therefore not leak off or lose its liquid fraction into the adjacent unconsolidated soils and sediments. The fracture fluid 40 should be able to carry the solids fraction (the proppant) of the fracture fluid 40 at low flow velocities that are encountered at the edges of a maturing azimuth controlled vertical fracture. The fracture fluid 40 should have the functional properties for its end use such as longevity, stability, compressibility, quality, texture, rheology, strength, porosity, permeability, etc.

The fracture fluid 40 should be compatible with the proppant, the subsurface formation, and the formation fluids. Further, the fracture fluid 40 should be capable of controlling its stable form to carry the proppant throughout the extent of the induced fracture in the formation. The fracture fluid 40 should be an efficient fluid, i.e. low leak off from the fracture into the formation, should be clean breaking with minimal residue, and should have a low friction coefficient.

The foam fracturing fluid's liquid phase viscosifier is generally either a linear or cross-linked gel, typical gels being without limitation of the following: a water-based guar gum gel, hydroxypropylguar (HPG), a natural polymer, or a cellulose-based gel, such as carboxymethylhydroxyethylcellulose (CMHEC). Cross-linkers are typically metallic ions, such as borate, antimony, zirconium, etc., disbursed between the polymers and produce a strong attraction between the metallic ion and the hydroxyl or carboxy groups. The foam is composed of generally a foaming agent, a liquid phase gel, entrained gases often carbon dioxide and/or nitrogen, clay stabilizer and breaker. The foam may have additional surfactants and additives to preserve and enhance foam structure, quality and stability over time. The foam fracture fluid-proppant mixture is injected into the formation and carries the proppant to the extremes of the fracture to propagate the fracture to its required lateral and vertical extent. The structure and stability of the foam fracture fluid 40 should be sufficiently high to ensure the proppant remains suspended during injection into the subsurface, otherwise proppant materials will sink or settle out in the fracture fluid 40.

Figure 8:
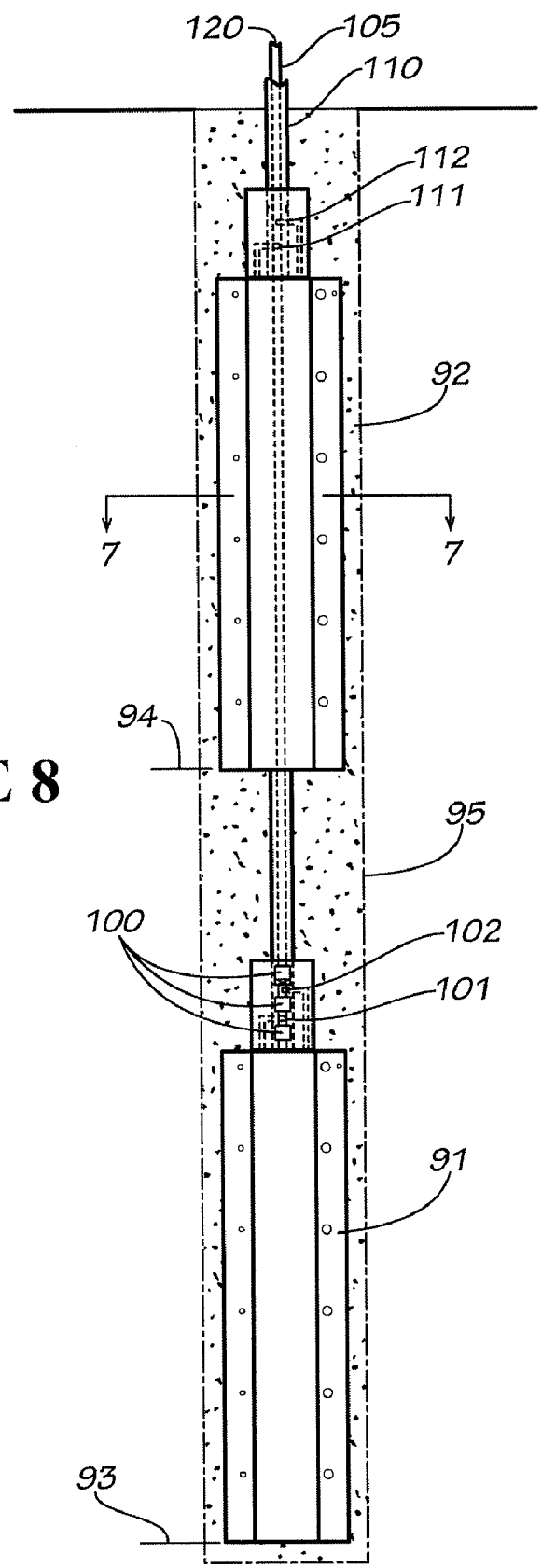
FIG. 8 is a cross-sectional side elevation view of two injection well casings each having a single fracture dual winged initiation sections located at two distinct depths prior to initiation of the controlled vertical fractures.

Referring to FIG. 8, two injection casings 91 and 92 are set at different distinct depths 93 and 94 in the borehole 95 and grouted into the formation by grout 3 filling the annular space between the injection casings 91 and 92 and the borehole 95. The lower injection casing 91 is fractured first, by filling the well bore passage 110 with sand to just below the lower most openings 101 and 102. The isolation packer 100 is lowered into the well bore passage 110 to just below the lowest opening 101 and expanded in the well bore passage 110 to achieve individual flow rate control of the fracturing fluid that enters the openings 101 and 102 respectively. The fracture fluid 120 is pumped into the isolation packer pipe string 105 and passes through the isolation packer 100 and into the openings 101 and 102 to initiate the vertical hydraulic fracture as described earlier. Following completion of the fracture in the first injection casing 91, the process is repeated by raising the isolation packer 100 to just below the lower most openings 111 and initiate the first fracture in the second injection casing 92, and the whole process is repeated to create all of the fractures in the injection casings installed in the bore hole 95.

Figure 9:
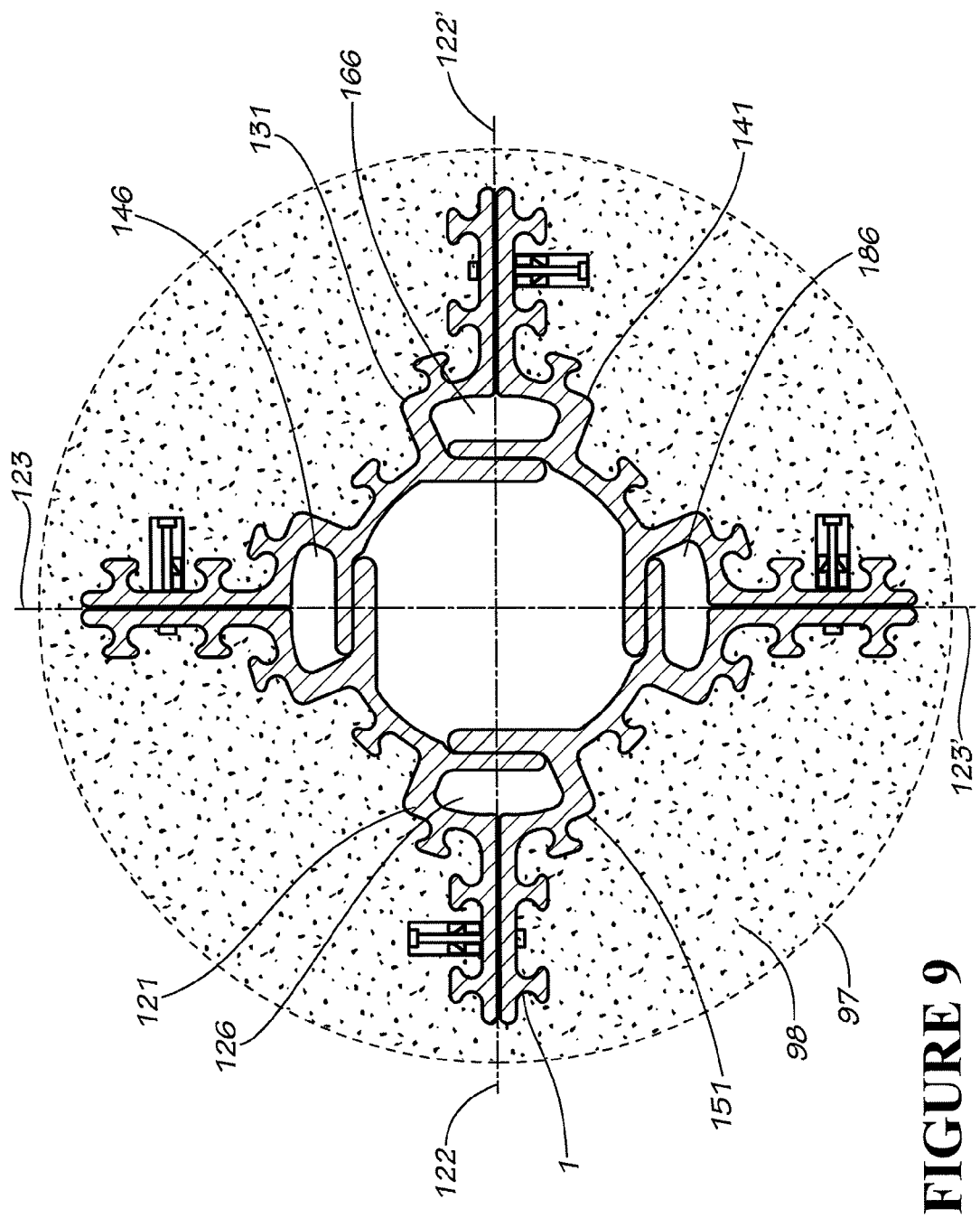
FIG. 9 is a horizontal cross-section view of a well casing having dual fracture dual winged initiation sections prior to the initiation of the controlled vertical fractures.
Figure 10:
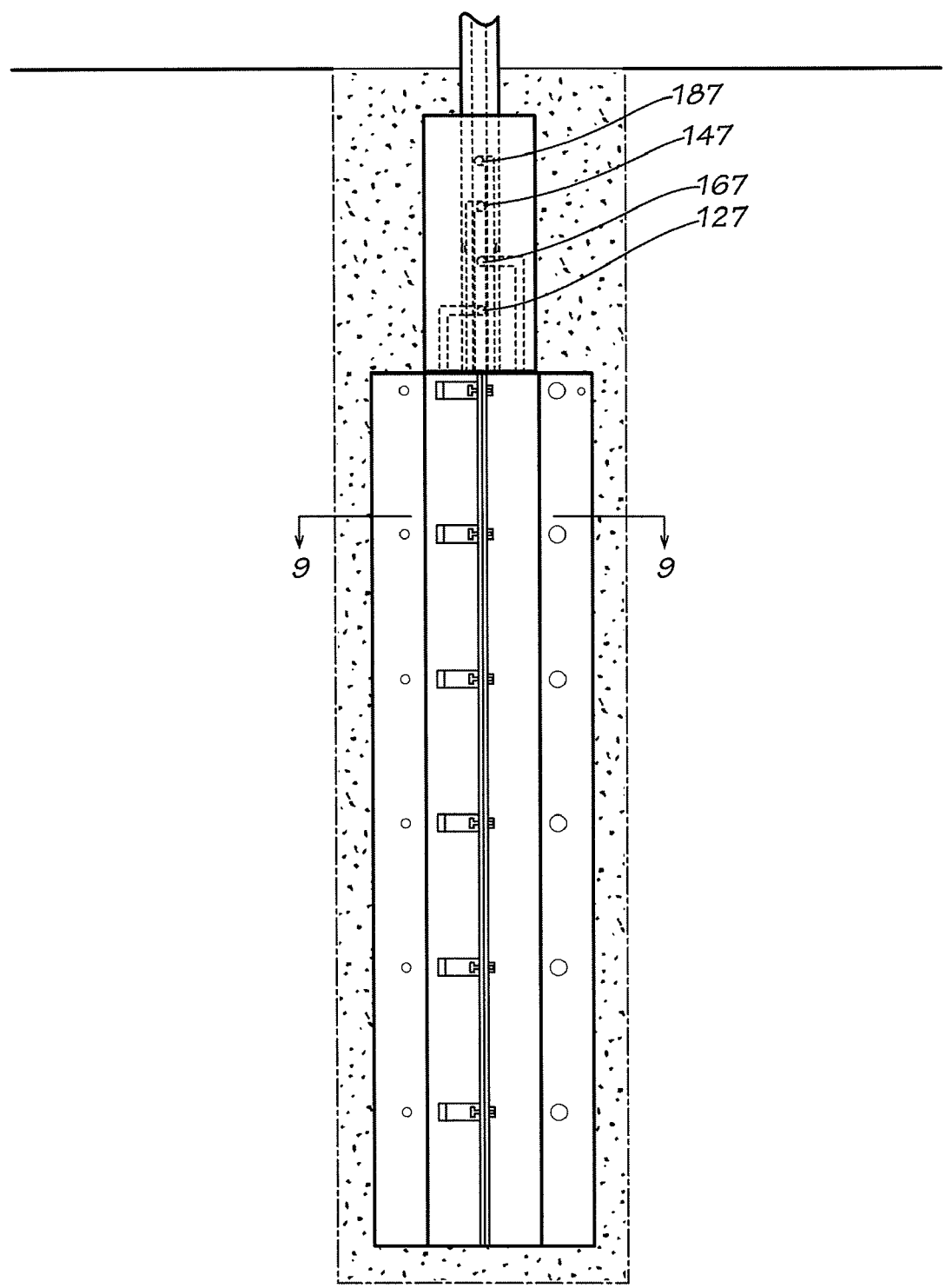
FIG. 10 is a cross-sectional side elevation view of a well casing having dual fracture dual winged initiation sections prior to initiation of the controlled vertical fractures.
Figure 11:
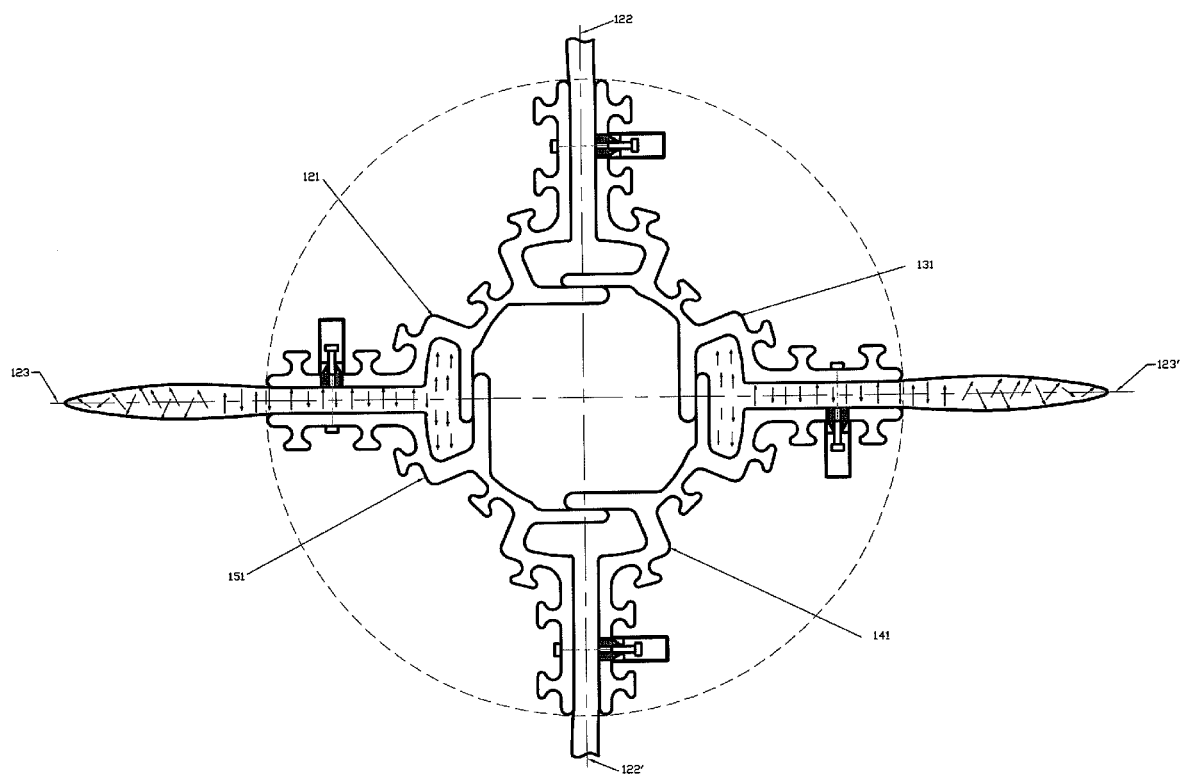
FIG. 11 is a horizontal cross-section view of a well casing having dual fracture dual winged initiation sections after initiation of the second controlled vertical fracture.

Another embodiment of the present invention is shown on FIGS. 9, 10, and 11, consisting of an injection casing 96 inserted in a bore hole 97 and grouted in place by a grout 98. The injection casing 96 consists of four symmetrical fracture initiation sections 121, 131, 141, and 151 to install a total of two hydraulic fractures on the different azimuth planes 122, 122' and 123, 123'. The passage for the first initiated fracture inducing passages 126 and 166 are connected to the openings 127 and 167, and the first fracture is initiated and propagated along the azimuth plane 122, 122' with controlled propagation of each individual wing of the fracture as described earlier. The second fracture inducing passages 146 and 186 are connected to the openings 147 and 187, and the second fracture is initiated and propagated along the azimuth plane 123, 123' as described earlier. The process results in two hydraulic fractures installed from a single well bore at different azimuths as shown on FIG. 11.

Finally, it will be understood that the preferred embodiment has been disclosed by way of example, and that other modifications may occur to those skilled in the art without departing from the scope and spirit of the appended claims.

What is claimed is:

1. A method for creating a vertical hydraulic fracture in a formation of unconsolidated and weakly cemented sediments, comprising:
   a. drilling a bore hole in the formation to a predetermined depth;
   b. installing an injection casing having at least two passages individually connected to a fracture fluid pumping system in the bore hole at the predetermined depth;
   c. establishing at least two pipes through which a foam fracture fluid can be separately injected into a corresponding number of passages within the injection casing;
   d. dilating the injection casing and the formation in a preferential direction;
   e. injecting foam fracture fluid separately and independently into one or both of said pipes and into the passages within the injection casing and into individual opposing wings of a fracture or into only one of two wings with sufficient fracturing pressure to initiate a vertical fracture at an azimuth orthogonal to the direction of dilation, thereby controlling a geometry of the hydraulic fracture in one or both of said wings in either a symmetrical or an asymmetrical fashion; and
   f. extracting fluids from the formation through the injection casing.

2. The method of claim 1, wherein the method further comprises:
   a. installing the injection casing at a predetermined depth in the bore hole, wherein an annular space exists between the outer surface of the casing and the bore hole,
   b. filling the annular space with a grout that bonds to the outer surface of the casing, wherein the casing has multiple initiation sections separated by a weakening line so that the initiation sections either separate, open, yield or stretch across the weakening line.

3. The method of claim 2, wherein the foam fracture fluid dilates the casing, grout annulus and the formation to initiate the fracture in the formation at a weakening line.

4. The method of claim 2, wherein a mandrel dilates the casing, grout annulus and the formation and the foam fracture fluid initiates the fracture in the formation at a weakening line.

5. The method of claim 2, wherein an expanding tool or packer dilates the casing, grout annulus and the formation and the foam fracture fluid initiates the fracture in the formation at a weakening line.

6. The method of claim 2, wherein the initiation sections do not close following completion of hydraulic fracturing to provide hydraulic connection of the fracture with the well bore.

7. The method of claim 2, wherein the casing comprises two initiation sections with two directions of dilation.

8. The method of claim 7, wherein the casing system enables controlling the rate of fracture fluid injection into each individual opposing wing of the initiated and propagating hydraulic fractures thereby controlling the geometry of the hydraulic fractures.

9. The method of claim 7, wherein the initiation sections do not close following completion of hydraulic fracturing to provide hydraulic connection of the fracture with the well bore.

10. The method of claim 2, wherein the casing comprises two initiation sections with two directions of dilation and the first and second weakening lines are orthogonal.

11. The method of claim 2, wherein the casing comprises three initiation sections with three directions of dilation.

12. The method of claim 11, wherein the casing system enables controlling the rate of fracture fluid injection into each individual opposing wing of the initiated and propagating hydraulic fractures thereby controlling the geometry of the hydraulic fractures.

13. The method of claim 11, wherein the initiation sections do not close following completion of hydraulic fracturing to provide hydraulic connection of the fracture with the well bore.

14. The method of claim 2, wherein the casing comprises four initiation sections with four directions of dilation, with the first and second weakening lines being orthogonal to each other and the third and fourth weakening lines being orthogonal to each other.

15. The method of claim 14, wherein the casing system enables controlling the rate of fracture fluid injection into each individual opposing wing of the initiated and propagating hydraulic fractures thereby controlling the geometry of the hydraulic fractures.

16. The method of claim 14, wherein the initiation sections do not close following completion of hydraulic fracturing to provide hydraulic connection of the fracture with the well bore.

17. The method of claim 1, wherein the foam fracture fluid is a polymer based foam fracturing fluid with either $CO_2$ or $N_2$ or a combination thereof to form the gaseous phase.

18. The method of claim 1, wherein the foam fracture fluid is a non-polymer based foam fracturing fluid with either $CO_2$ or $N_2$ or a combination thereof to form the gaseous phase.

19. The method of claim 1, wherein the foam fracture fluid comprises a proppant.

20. The method of claim 19, wherein the fracture fluid comprises a proppant which has a size ranging from #4 to #100 U.S. mesh, and the proppant is selected from a group consisting of sand, resin-coated sand, epoxy-coated sand, ceramic beads, synthetic organic beads, glass microspheres, resin coated proppant and sintered minerals.

21. The method of claim 1, wherein the fracture fluid comprises a proppant, and the foam fracture fluid is able to carry the proppant of the fracture fluid at low flow velocities.

22. The method of claim 1, wherein the foam fracture fluid comprises a proppant and a proppant flowback-retention agent.

23. The method of claim 22, wherein the fracture fluid comprises a proppant flowback-retention agent, which is selected from a group consisting of natural organic fibers, synthetic organic fibers, glass fibers, carbon fibers, ceramic fibers, inorganic fibers, and metal fibers.

24. The method of claim 1, wherein the fracture fluid is clean breaking with minimal residue.

25. The method of claim 1, wherein the fracture fluid has a low friction coefficient.

26. The method of claim 1, wherein the fracture fluid injection rate, pressure and proppant loading is selected so as to promote a screening out of the fracture at the tip to create a wide fracture.

27. The method of claim 1, wherein the casing system enables controlling the rate of fracture fluid injection into each individual opposing wing of the initiated and propagating hydraulic fracture thereby controlling the geometry of the hydraulic fracture.

28. The method of claim 1, wherein the method further comprises re-fracturing of each previously injected fracture.

29. The method of claim 1, wherein the dilation of the formation is achieved by first cutting a vertical slot in the formation at the required azimuth for the initiated fracture, injecting a fracture fluid into the slot with a sufficient fracturing pressure to dilate the formation in this preferential direction and thereby initiate a vertical fracture at an azimuth orthogonal to the direction of dilation; and controlling the form of the fracturing fluid to be a foam based fracturing fluid.

30. A well in a formation of unconsolidated and weakly cemented sediments, comprising a bore hole in the formation to a predetermined depth; an injection casing having at least two passages in the bore hole at the predetermined depth capable of acting as a production well bore for extraction of fluids from the formation; a source for delivering a fracture fluid separately and independently into one or both of said passages within the injection casing and into individual opposing wings of a fracture or into only one of two wings with sufficient fracturing pressure to dilate the injection casing and the formation and initiate a vertical fracture with a fracture tip at an azimuth orthogonal to the direction of dilation, thereby controlling a geometry of the hydraulic fracture in one or both of said wings in either a symmetrical or an asymmetrical fashion, wherein said source is individually connected to each of the at least two passages, at least two pipes through which a fracture fluid can be separately injected into a corresponding number of passages within the injection casing, wherein the injection casing further comprises:
  a. multiple initiation sections separated by a weakening line and wherein said at least two passages within the injection casing are within the initiation sections and communicating across the weakening line for the introduction of the fracture fluid to dilate the casing and separate the initiation sections along the weakening line, wherein the passages to each opposing wing of the fracture are connected to the source of fracture fluid to dilate the formation in a preferential direction and thereby initiate the vertical fracture at the azimuth orthogonal to the direction of dilation and to control the propagation rate of each individual opposing wing of the hydraulic fracture, and
  b. the source delivers the fracture fluid in the form of a stable foam during the fracturing process.

31. The well of claim 30, wherein the foam fracture fluid is a polymer based foam fracturing fluid with either $CO_2$ or $N_2$ or a combination thereof to form the gaseous phase.

32. The well of claim 30, wherein the foam fracture fluid is a non-polymer based foam fracturing fluid with either $CO_2$ or $N_2$ or a combination thereof to form the gaseous phase.

33. The well of claim 30, wherein the foam fracture fluid comprises a proppant.

34. The well of claim 30, wherein the foam fracture fluid comprises a proppant, and the fracture fluid is able to carry the proppant of the fracture fluid at low flow velocities.

35. The well of claim 34, wherein the foam fracture fluid comprises a proppant which has a size ranging from #4 to #100 U.S. mesh, and the proppant is selected from a group consisting of sand, resin-coated sand, epoxy-coated sand, ceramic beads, synthetic organic beads, glass microspheres, resin coated proppant and sintered minerals.

36. The well of claim 30, wherein the foam fracture fluid comprises a proppant and a proppant flowback-retention agent.

37. The well of claim 36, wherein the fracture fluid comprises a proppant flowback-retention agent, which is selected from a group consisting of natural organic fibers, synthetic organic fibers, glass fibers, carbon fibers, ceramic fibers, inorganic fibers, and metal fibers.

38. The well of claim 30, wherein the foam fracture fluid is clean breaking with minimal residue.

39. The well of claim 30, wherein the foam fracture fluid has a low friction coefficient.

40. The well of claim 30, wherein the foam fracture fluid injection rate, pressure, and proppant loading is selected so as to promote a screening out of the fracture at the tip to create a wide fracture.

41. The well of claim 30, wherein the initiation sections do not close following completion of hydraulic fracturing to provide hydraulic connection of the fracture with the well bore.

42. The well of claim 30, wherein the method further comprises re-fracturing of each previously injected fracture.

43. A well in a formation of unconsolidated and weakly cemented sediments, comprising a bore hole in the formation to a predetermined depth; an injection casing in the bore hole at the predetermined depth capable of acting as a production well bore for extraction of fluids from the formation, the injection casing comprising multiple initiation sections separated by a weakening line, at least two passages within the initiation sections communicate a fracture fluid to each opposing wing of a selected weakening line, wherein each weakening line corresponds to one of a plurality of fracture planes; and a source for delivering the fracture fluid separately and independently through at least two pipes connected to the source at one end, and a corresponding number of passages at the other end with sufficient pressure to dilate the formation, and initiate a two-winged fracture, wherein said wings are opposing, with a fracture tip in the formation along the desired fracture plane, and controlling a geometry of the hydraulic fracture in one or both of said wings in either a symmetrical or an asymmetrical fashion, and controlling the form of the fracture fluid to be a stable foam during the fracturing process.

44. A well in a formation of unconsolidated and weakly cemented sediments, comprising a bore hole in the formation to a predetermined depth; an injection casing having at least two passages in the bore hole at the predetermined depth capable of acting as a production well bore for extraction of fluids from the formation, the injection casing comprising multiple initiation sections separated by a weakening line, the at least two passages within the initiation sections communicate a fracture fluid to each opposing wing of a selected opposed pair of weakening lines, wherein each opposed pair of weakening lines corresponds to one of a plurality of desired fracture planes; and a source for delivering the fracture fluid with sufficient pressure to dilate the formation, and initiate a two-winged fracture, wherein said wings are opposing, with a fracture tip in the formation along the desired fracture plane, wherein said source is individually connected to each of the at least two passages, at least two pipes through which a fracture fluid can be separately and independently injected into a corresponding number of passages within the injection casing, and controlling a geometry of the hydraulic fracture in one or both of said wings in either a symmetrical or an asymmetrical fashion, and controlling the form of the fracture fluid to be a stable foam during the fracturing process.

45. A method for creating a vertical hydraulic fracture in a formation of unconsolidated and weakly cemented sediments, comprising:
  a. drilling a bore hole in the formation to a predetermined depth;
  b. installing an injection casing having at least two passages individually connected to a fracture fluid pumping system in the bore hole at the predetermined depth in the bore hole, wherein an annular space exists between the outer surface of the casing and the bore hole;
  c. establishing at least two pipes through which a foam fracture fluid can be separately injected into a corresponding number of passages within the injection casing;
  d. dilating the injection casing and the formation in a preferential direction, wherein the casing comprises three initiation sections with three directions of dilation;
  e. injecting foam fracture fluid separately and independently into one or both of said pipes and into the passages within the injection casing and into individual opposing wings of a fracture or into only one of two wings with sufficient fracturing pressure to initiate a vertical fracture at an azimuth orthogonal to the direction of dilation, thereby controlling a geometry of the hydraulic fracture in one or both of said wings in either a symmetrical or an asymmetrical fashion; and,
  f. filling the annular space with a grout that bonds to the outer surface of the casing, wherein the casing has multiple initiation sections separated by a weakening line so that the initiation sections either separate, open, yield or stretch across the weakening line.

46. The method of claim 45, wherein the casing system enables controlling the rate of fracture fluid injection into each individual opposing wing of the initiated and propagating hydraulic fractures thereby controlling the geometry of the hydraulic fractures.

47. The method of claim 45, wherein the initiation sections do not close following completion of hydraulic fracturing to provide hydraulic connection of the fracture with the well bore.

48. A method for creating a vertical hydraulic fracture in a formation of unconsolidated and weakly cemented sediments, comprising:
  a. drilling a bore hole in the formation to a predetermined depth;
  b. installing an injection casing having at least two passages individually connected to a fracture fluid pumping system in the bore hole at the predetermined depth in the bore hole, wherein an annular space exists between the outer surface of the casing and the bore hole;
  c. establishing at least two pipes through which a foam fracture fluid can be separately injected into a corresponding number of passages within the injection casing;
  d. dilating the injection casing and the formation in a preferential direction wherein the casing comprises four initiation sections with four directions of dilation, with the first and second weakening lines being orthogonal to each other and the third and fourth weakening lines being orthogonal to each other;
  e. injecting foam fracture fluid separately and independently into one or both of said pipes and into the passages within the injection casing and into individual opposing wings of a fracture or into only one of two wings with sufficient fracturing pressure to initiate a vertical fracture at an azimuth orthogonal to the direction of dilation, thereby controlling a geometry of the hydraulic fracture in one or both of said wings in either a symmetrical or an asymmetrical fashion; and,
  f. filling the annular space with a grout that bonds to the outer surface of the casing, wherein the casing has multiple initiation sections separated by a weakening line so that the initiation sections either separate, open, yield or stretch across the weakening line.

49. The method of claim 48, wherein the casing system enables controlling the rate of fracture fluid injection into each individual opposing wing of the initiated and propagating hydraulic fractures thereby controlling the geometry of the hydraulic fractures.

50. The method of claim 48, wherein the initiation sections do not close following completion of hydraulic fracturing to provide hydraulic connection of the fracture with the well bore.

* * * * *